United States Patent [19]

Noguchi et al.

[11] Patent Number: 5,066,770
[45] Date of Patent: Nov. 19, 1991

[54] PROCESS AND APPARATUS FOR MANUFACTURING POLYMERS

[75] Inventors: Takehiko Noguchi, Nagaokakyo; Takashi Sakubata; Hirosaku Nagano, both of Ohtsu, all of Japan

[73] Assignee: Kanegafuchi Kagaku Kogyo Kabushiki Kaisha, Osaka, Japan

[21] Appl. No.: 334,424

[22] Filed: Apr. 7, 1989

[30] Foreign Application Priority Data

Apr. 10, 1988 [JP] Japan .................................. 63-87576
Apr. 11, 1988 [JP] Japan .................................. 63-89462

[51] Int. Cl.$^5$ ......................... C08G 69/26; C08F 2/38
[52] U.S. Cl. ................................... 528/353; 528/342; 526/85
[58] Field of Search .................... 528/342, 353; 526/85

[56] References Cited

U.S. PATENT DOCUMENTS

| 3,674,741 | 7/1972 | Shunichiro et al. | 528/342 |
| 3,745,149 | 7/1973 | Serafini et al. | 528/342 |
| 4,321,319 | 3/1982 | Shoji et al. | 528/342 |
| 4,585,852 | 4/1986 | Lo | 528/185 |
| 4,603,193 | 7/1986 | Richardson et al. | 528/342 |

OTHER PUBLICATIONS

Journal of Polymer Science: Polymer Chemistry Edition, vol. 19, 1981 pp. 795–805, John Wiley & Son, Inc.; D. Kumar; "Condensation Polymerization of of Pyromellitic Dianhydride with Aromatic Mechanism".

Primary Examiner—John Kight, III
Assistant Examiner—Kathryne J. Shelborne
Attorney, Agent, or Firm—Armstrong, Nikaido, Marmelstein, Kubovcik & Murray

[57] ABSTRACT

A process for manufacturing a polymer includes the first step of reacting a solution of one of two starting materials in an organic solvent with the other material in the form of a powder, and the second step of reacting a solution of the reaction product of the first step in an organic solvent with a solution of the other material in an organic solvent. The process preferably includes one or both of two additional steps, i.e. filtering the reaction product of the first step, and degassing the reaction product of the second step by stirring it at a reduced pressure. An apparatus for carrying out the process is also disclosed. This invention makes it possible to produce a polymer of high and uniform quality having a final viscosity controlled within a certain range and not containing foreign matter or bubbles.

12 Claims, 2 Drawing Sheets

PROCESS AND APPARATUS FOR MANUFACTURING POLYMERS

BACKGROUND OF THE INVENTION

1. Field of the Invention:

This invention relates to a process and an apparatus which are used for manufacturing polymers.

2. Description of the Prior Art:

A known process for manufacturing polymers will be described by way of example with reference to the preparation of a solution of polyamide acid in an organic solvent as a precursor for polyimides which are used for a wide range of purposes including the manufacture of parts for electronic devices because of their good heat resistance and electrical insulating properties, and which are, therefore, required to be of high quality.

A solution of polyamide acid in an organic solvent has hitherto been prepared by adding a powder of dianhydride of an organic tetracarboxylic acid into a solution of an organic diamine in an organic solvent to cause them to react with each other, and stopping its addition when the growth in molecular chain of polyamide acid has resulted in a solution having a predetermined level of viscosity (several thousand poise). The polyamide acid which has been obtained is converted to polyimides which are used to form film, or the like.

The viscosity of the polyamide acid solution shows a logarithmic increase with the progress of reaction between the diamine and the dianhydride and finally reaches several thousand poise. As the final viscosity of the solution affects the properties of polyimides obtained by the conversion of polyamide acid, it is not allowed to differ from one lot of products to another, and must always be kept within a certain range. As the viscosity shows a logarithmic increase, however, the known process which employs the powder of dianhydride of an organic tetracarboxylic acid can hardly achieve the final viscosity controlled within a certain range and manufacture products of steady quality.

It is possible to lower the viscosity of the polyamide acid solution if an increased amount of organic solvent is employed. The use of an increased amount of solvent is, however, not only a disadvantage to the productivity of polyamide acid and polyimides obtained by the conversion thereof, but also results in a polyimide film of lower strength.

A detailed examination of products has revealed the presence of a variation in properties. This variation has been found to be due to the fact that the polyamide acid solution lacks uniformity. Although this may be a problem which can be overcome if the solution is carefully stirred in the reaction system, the uniform stirring of a fluid having a viscosity which is as high as several thousand poise requires a long time and is only possible at the sacrifice of productivity.

Moreover, polyimides and other polymers that are used for making parts of electronic devices, or the like are required to be of high quality, not containing any dust or other impurities. It has, however, been impossible to remove dust or other impurities from the powder of dianhydride of an organic tetracarboxylic acid. It has also been difficult to remove such impurities by filtration from the polyamide acid solution having a viscosity of several thousand poise. Therefore, the problem of removing impurities from polyamide acid has remained still to be solved.

These polymers contain numerous bubbles and these bubbles must be removed before the polymer is molded to form a product. It has hitherto been usual to remove bubbles from a viscous fluid, such as a plastic material, by placing the fluid in a tightly closed vessel and creating a reduced pressure in the vessel to allow the bubbles to expand and float to the surface of the fluid, so that they may eventually leave the fluid. However, this method, which relies upon the floating force of bubbles per se, requires an undesirably long time for the complete removal of bubbles and is only useful at the sacrifice of productivity. Moreover, bubbles are difficult to remove from that portion of the fluid which contacts the inner wall surface of the vessel, and the viscosity of the fluid is too high, and so it prevents the effective growth and movement of bubbles and therefore makes it impossible to remove bubbles unless a high vacuum is created in the vessel.

Although various problems have been pointed out in connection with the preparation of a polyamide acid solution as a precursor for polyimides, they also remain yet to be solved in connection with the preparation of other polymers that are required to be of high quality, particularly those which are prepared by the reaction of two substances in a solution formed by an organic solvent.

SUMMARY OF THE INVENTION

It is an object of this invention to provide a process which can always manufacture polymers of uniform quality having the final viscosity controlled within a certain range.

It is another object of this invention to provide a process which can manufacture polymers not containing bubbles.

It is still another object of this invention to provide an apparatus which can be employed for carrying out the process of this invention.

According to this invention, there is provided a process for manufacturing a polymer from two starting materials which comprises:

(a) the first step of reacting a solution of one of the materials in an organic solvent with the other material in the form of a powder; and (b) the second step of reacting a solution of the reaction product of the first step in an organic solvent with a solution of the other material in an organic solvent.

According to a preferred aspect of the process of this invention, the step of filtering the solution of the reaction product of the first step is provided between the first and second steps.

According to another preferred aspect of the process of this invention, the product of the second step is degassed at a reduced pressure under stirring.

According to this invention, there is also provided an apparatus for manufacturing a polymer from two starting materials which comprises:

(a) a first reactor for reacting a solution of one of the materials in an organic solvent with the other material in the form of a powder, while the solution is stirred; and (b) a second reactor for reacting a solution in an organic solvent of the reaction product which has been obtained in the first reactor, with a solution of the other material in an organic solvent, while the mixed solution is stirred.

According to a preferred aspect of the apparatus of this invention, a filter is provided for purifying the solution of the reaction product which has been obtained in the first reactor.

According to another preferred aspect of the apparatus of this invention, the second reactor is provided with a device for creating a reduced pressure in the reactor and a device for stirring the solution of the reaction product in the reactor, or a tightly closed vessel having such devices is provided separately from the reactors.

Other features and advantages of this invention will become apparent from the following description and the accompanying drawings.

DETAILED DESCRIPTION OF THE INVENTION

Figure 1:
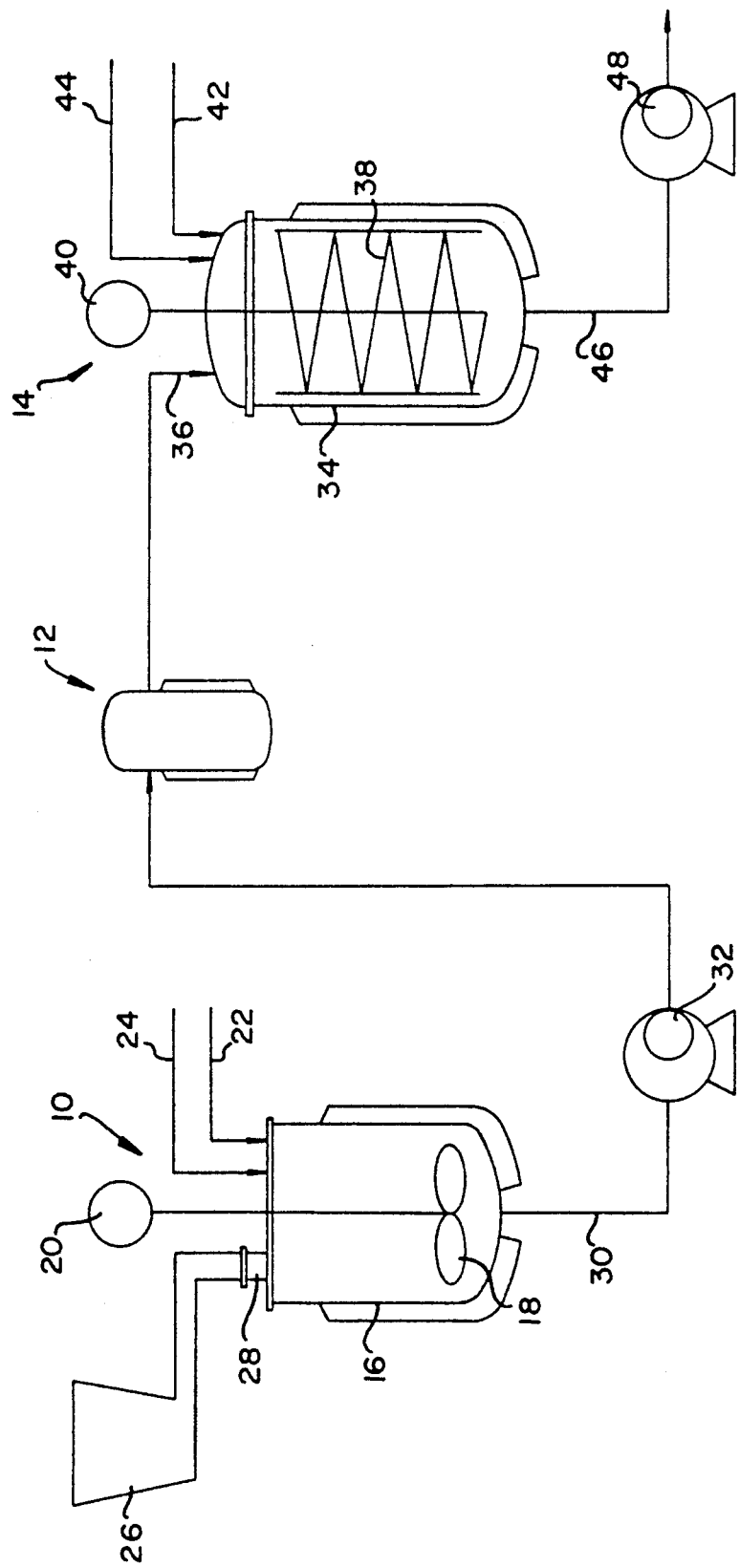
FIG. 1 is a diagrammatic view of an apparatus embodying this invention.

According to the first step of the process of this invention, a solution of one of two starting materials in an organic solvent is reacted with the other material in the form of a powder to yield a solution of a polymer (reaction product) not yet having the final viscosity, i.e. still having a low degree of polymerization. This polymer solution is reacted with a solution of the other material in an organic solvent during the second step of the process. The solution of the other material may be controlled in concentration as desired and may be added to the polymer solution little by little in any quantity as desired. Therefore, the reaction of the two materials can always be caused to take place in a uniform mixture of the two solutions and thereby yield a polymer having the final viscosity (degree of polymerization) controlled within a certain range.

Another step is preferably provided between the first and second steps of the process for filtering the polymer solution obtained by the first step to remove therefrom any dust or other impurities that the starting solution of one material and the powder of the other material may have contained, and the undissolved powder of the other material, if any. Then, the polymer solution is reacted with the solution of the other material, from which impurities may also have been removed by filtration, whereby a polymer having the final viscosity controlled within a predetermined range is obtained. Therefore, it is possible to produce a polymer which is free from any dust or other impurities and any undissolved or unreacted material, and which can, therefore, be used for making a molded resin product of high quality.

Although the first and second steps of the process can be carried out successively in a single reactor, it is preferable to employ an apparatus which includes a first reactor for carrying out the first step and a second reactor for carrying out the second step. The first reactor may be one having stirring blades of e.g. the Henschel type which are suitable for stirring and mixing a solution of low viscosity and a powder, while the second reactor may be one having, for example, spiral ribbon-shaped stirring blades which are suitable for stirring and mixing a solution of high viscosity. The first reactor is used for reacting a solution of one of the two materials in an organic solvent with the other material in the form of a powder under uniform stirring to prepare a polymer not yet having the final viscosity, i.e. still having a low degree of polymerization. This polymer is transferred into the second reactor and is reacted with a solution of the other material in an organic solvent under uniform stirring to yield a polymer having an appropriate final viscosity, or degree of polymerization.

The apparatus may further include a filter to ensure the production of a polymer not containing impurities. The filter is provided for removing impurities from the polymer which has been obtained in the first reactor and is transferred to the second reactor.

The polymer is preferably degassed at a reduced pressure under stirring. This step of degassing may be carried out either immediately after the second step of the process or immediately before the polymer is molded into a particular product. Therefore, the second reactor may include a device for creating a reduced pressure therein so that the degassing of the polymer may be carried out in the second reactor, or the apparatus may further include a tightly closed vessel having a device for creating a reduced pressure therein and a stirrer.

The viscous fluid in the second reactor or the tightly closed vessel is stirred slowly at a speed not causing any entrainment of air, while a reduced pressure is created therein. The reduced pressure allows the bubbles in the fluid to expand and the stirring of the fluid causes the bubbles to combine and grow into larger bubbles having a greater floating force which causes them to leave the fluid quickly. Even if the fluid may be of high viscosity, its stirring promotes the expansion of bubbles and their combination and growth, so that the bubbles may float to the surface of the fluid and release gas therefrom, whereby an effectively degassed polymer can be obtained.

The invention will now be described in further detail with reference to the drawings. An apparatus embodying this invention is shown by way of example in FIG. 1. The apparatus comprises a first reactor 10, a filter 12 and a second reactor 14. The following description of the apparatus will be made with reference to the production of polyamide acid by way of example.

The first reactor 10 comprises a reaction vessel 16 which can be maintained at a specific temperature, a stirrer 18 disposed in the reaction vessel 16 and having a plurality of blades, and a motor 20 for rotating the stirrer 18. The reaction vessel 16 is provided at its top with supply inlets 22 and 24 through which an organic diamine and an organic solvent, respectively, are supplied into the vessel 16, and also with another supply inlet 28 connected to a hopper 26 for holding a powder of dianhydride of an organic tetracarboxylic acid. The reaction vessel 16 has a bottom provided with a discharge outlet 30 through which the polyamide acid which has been produced in the vessel 16 is discharged therefrom.

The organic diamine which is employed for the purpose of this invention is a compound of the general formula I:

$$H_2N-R_0-NH_2 \qquad (I)$$

where $R_0$ is a divalent organic group; or a mixture of two or more such compounds. The organic diamine compound is preferably selected from organic diamines of the general formula III:

$$H_2N-R_1-NH_2 \qquad (III)$$

where $R_1$ is an aliphatic group, a phenylene group, a naphthalene group, a biphenylene group, a

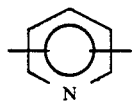

group, or a divalent organic group of the general formula IV:

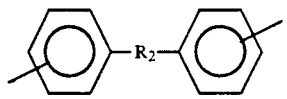 (IV)

where $R_2$ is an alkylene group having 1 to 4 carbon atoms,

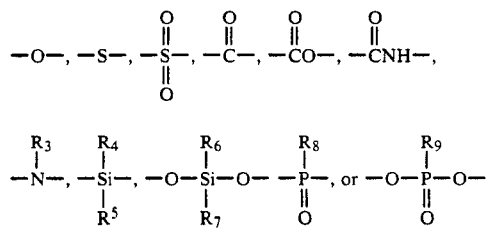

where $R_3$ to $R_9$ are each an aliphatic or aromatic group; or the compounds thereof. Specific examples thereof are metaphenylenediamine, paraphenylenediamine, 4,4'-diaminodiphenylpropane, 4,4'-diaminodiphenylmethane, benzidine, 4,4'-diaminodiphenylsulfone, 3,3'-diaminodiphenylsulfone, 4,4'-diaminodiphenyl ether, 2,6-diaminopyridine, bis(4-aminophenyl)diethylsilane, bis(4-aminophenyl)diphenylsilane, 3,3'-dichlorobenzidine, bis(4-aminophenyl)ethylphosphine oxide, bis(4-aminophenyl)-N-phenylamine, bis(4-aminophenyl)-N-methylamine, 1,5-diaminonaphthalene, 3,3'-dimethyl-4,4'-diaminodiphenyl, 3,3'-dimethoxybenzidine, ethylenediamine, tr imethylenediamine, tetramethylenediamine, pe ntamethylenediamine, hexamethylenediamine, 1,7-diaminoheptane, 1,8-diaminooctane, 1,9-diaminononane and 1,10-diaminodecane, and a mixture of two or more such compounds. Paraphenylenediamine, 3,3'-dimethyl-4,4'-diaminodiphenyl or 4,4'-diaminodiphenyl ether is, among others, especially preferred.

The dianhydride of an organic tetracarboxylic acid which is employed for the purpose of this invention is a compound of the general formula II:

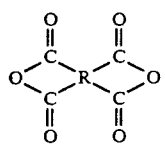 (II)

where R is a tetravalent organic group; or a mixture of two or more such compounds. It is particularly preferable to use a compound of the general formula V:

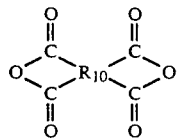 (V)

where $R_{10}$ is an aliphatic group,

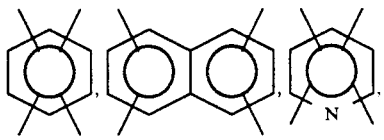

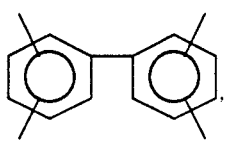

(where $R_{11}$ and $R_{12}$ are each a hydrogen atom or a methyl group),

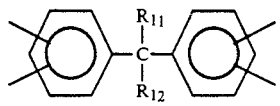

or a mixture of two or more such compounds. Specific examples of the compounds are pyromellitic anhydride, 2,3,6,7-naphthalenetetracarboxylic acid dianhydride, 3,3',4,4'-diphenyltetracarboxylic acid dianhydride, 1,2,5,6-naphthalenetetracarboxylic acid dianhydride, 2,2',3,3'-diphenyltetracarboxylic acid dianhydride, 2,3,5,6-pyridinetetracarboxylic acid dianhydride, 2,2-bis(3,4-dicarboxyphenyl)propane dianhydride, bis(3,4-dicarboxyphenyl)sulfone dianhydride, 3,4,9,10-perilenetetracarboxylic acid dianhydride, bis(3,4-dicarboxyphenyl) ether dianhydride, 1,2,4,5-naphthalenetetracarboxylic acid dianhydride, 1,2,5,8-naphthalenetetracarboxylic acid dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, bis(3,4-dicarboxyphenyl)sulfone dianhydride, benzene-1,2,3,4-tetracarboxylic acid dianhydride, and 3,4,3',4'-benzophenonetetracarboxylic acid dianhydride. It is possible to use a mixture of two or more such compounds. Pyromellitic anhydride or 3,3',4,4'-diphenyltetracarboxylic acid dianhydride is, among others, especially preferred.

As regards the organic solvent, it is possible to use, for example, N,N-dimethylformamide, N,N-dimethylacetamide, N,N-diethylformamide, N,N-diethylacetamide, N,N-dimethylmethoxyacetamide, dimethyl sulfoxide, hexamethylphosphoramide, N-methyl-2-pyrrolidone or dimethylsulfone, or a mixture of two or more such compounds.

It is also possible to use a mixture of any such solvent with another solvent such as benzene, toluene, xylene, benzonitrile, dioxane or cyclohexane. It is, however, important to use a solvent which is good not only for the organic diamine, but also for the organic tetracarboxylic acid dianhydride and polyamide acid. Therefore, it is preferable to use N,N-dimethylformamide, N,N-dimethylacetamide, dimethyl sulfoxide or N-methyl-2-pyrrolidone, or a mixture thereof.

The organic diamine and the organic solvent are supplied into the reaction vessel 16 through the supply inlets 22 and 24, respectively, and the powder of the organic tetracarboxylic acid dianhydride though the supply inlet 28. They are stirred and mixed together by the stirrer 18 and are thereby caused to react with each other to form polyamide acid. With the growth in molecular chain of the polyamide acid, the viscosity of its solution shows a logarithmic increase. During the first step of the process, therefore, the organic tetracarboxylic acid dianhydride is supplied into the reaction vessel 16 in such an amount as can keep the viscosity of the solution of the resulting polyamide acid at a low level not exceeding, say, 500 poise, preferably not exceeding 100 poise, and more preferably in the range of about 10 to 30 poise.

When we, the inventors of this invention, employed oxydianiline as the organic diamine, pyromellitic acid dianhydride as the organic tetracarboxylic acid dianhydride and dimethylformamide as the organic solvent by way of example to produce polyamide acid, we found it possible to obtain a solution of polyamide acid having a viscosity of about 20 poise by employing during the first step of the process not more than 99%, and preferably 95 to 97%, of the total amount of pyromellitic acid dianhydride to be employed. When we employed during the first step of the process more than 99% of the total amount of pyromellitic acid dianhydride to be employed, we could obtain only a solution of polyamide acid that was too viscous to allow precision filtration. When we employed too small an amount of pyromellitic acid dianhydride during the first step of the process, we could only obtain a product containing polyamide acid at too low a concentration, since we had to add too large an amount of a solution of pyromellitic acid dianhydride during the second step. Therefore, the amount of the dianhydride powder to be employed during the first step must be so selected as to ensure that the resulting solution of polyamide acid have a viscosity allowing its precision filtration, and that the product of the second step contain polyamide acid at a satisfactorily high concentration.

The solution of polyamide acid which has been produced in the first reactor 10 is delivered by a pump 32 from the discharge outlet 30 at the bottom of the reaction vessel 16 to the filter 12 in which it is subjected to precision filtration. Then, the solution is supplied into the reaction vessel 34 of the second reactor 14 through its supply inlet 36. The filter 12 is provided for removing from the product of the first reactor 10 any impurities that the organic diamine, tetracarboxylic acid dianhydride and solvent may have contained, any undissolved powder of the organic tetracarboxylic acid dianhydride and any other foreign matter and thereby producing a solution of polyamide acid not containing impurities.

The second reactor 14 comprises the reaction vessel 34 held at a predetermined temperature, a stirrer 38 composed of a spiral ribbon and disposed in the reaction vessel 34 and a motor 40 for rotating the stirrer 38. The supply inlet 36 for receiving the solution of polyamide acid from the first reactor 10 is provided at the top of the reaction vessel 34. The reaction vessel 34 is also provided at its top with supply inlets 42 and 44 through which the solution of the organic tetracarboxylic acid dianhydride and a filler, respectively, are supplied into the vessel 34. A discharge outlet 46 is provided at the bottom of the reaction vessel 34 for discharging the solution of polyamide acid. The filler may include silicon powder, calcium hydrogenphosphate powder, titanium dioxide powder, etc.

The filler is added, if required. It may be added either substantially simultaneously with the solution of the dianhydride, or before the polyamide acid which is produced starts to increase its viscosity. We employed about 0.001 to 5% by weight of the filler by way of example as mentioned earlier.

The solution of the dianhydride is one prepared from the same organic tetracarboxylic acid dianhydride as that employed during the first step of the process, by employing the same or a different organic solvent. The solution is filtered, if required, and is supplied little by little through the supply inlet 42 and reacted with the solution of polyamide acid, while the two solutions are uniformly stirred. The addition of the dianhydride solution causes the polyamide acid to grow in molecular chain and show a logarithmic increase in viscosity. The addition of the dianhydride solution is discontinued when the viscosity of the resulting polyamide acid has reached a level of several thousand poise, e.g. 2000 to 3000 poise. As the dianhydride is employed in the form of a solution, its addition is easy to control accurately. It can be distributed uniformly throughout the reaction vessel 34 and is caused by the stirrer 38 to spread through the solution of polyamide acid quickly and react with it uniformly.

The pyromellitic acid dianhydride which we used by way of example as hereinabove stated showed a solubility of about 10% in dimethylformamide at room temperature and prepared a solution having a concentration of 6 to 7%. As is obvious from these results, a solution of any organic tetracarboxylic acid dianhydride in general in an organic solvent has only a low concentration. Therefore, and also as any such dianhydride is unstable in its solution, it is impossible to obtain polyamide acid having a satisfactorily high final degree of polymerization if only the solution of any such dianhydride is reacted with an organic diamine. Moreover, the high proportion of the solvent in the solution disables the production of a solution of polyamide acid having a high concentration. We obtained a solution of polyamide acid having a concentration of 10 to 20% based on the weight of dimethylformamide.

The solution of polyamide acid having a low degree of polymerization which has been transferred from the first reactor 10 to the second reactor 14 is reacted with the solution of the organic tetracarboxylic acid dianhydride, while the two solutions, and the filler if employed, are mixed together uniformly by the spiral stirrer 38, whereby polyamide acid having a high degree of polymerization, i.e. a high viscosity, is produced. After the polyamide acid has been degassed in the reaction vessel 34, if required, it is discharged through its discharge outlet 46 and delivered by a pump 48 to a temporary storage tank or a molding apparatus.

As is obvious from the foregoing description, the process of this invention can always produce polyamide acids which are substantially uniform in viscosity, concentration and quality, since the powder of organic tetracarboxylic acid dianhydride is reacted with an organic diamine during the first step to prepare a solution of polyamide acid having a low degree of polymerization (low viscosity) and the product of the first step is reacted with the solution of the dianhydride during the second step to produce a solution of polyamide acid having a high degree of polymerization. The use of the first and second reactors for carrying out the first and second steps, respectively, of the process ensures that the materials to be reacted be stirred in the optimum way as required by their viscosity and other properties, and mixed together rapidly and uniformly. Moreover, the step of filtration ensures the production of polyamide acid not containing impurities.

Although the process and apparatus of this invention have been described by way of example, it is to be understood that modifications or variations may be easily made without departing from the scope of this invention. For example, the filter is not essential, but may be used only when it is necessary to produce a polymer not containing impurities which is required for making parts of electronic devices, or the like. The apparatus does not necessarily have to comprise two reactors, as the two steps of the process can also be carried out in a single reactor.

Figure 2:
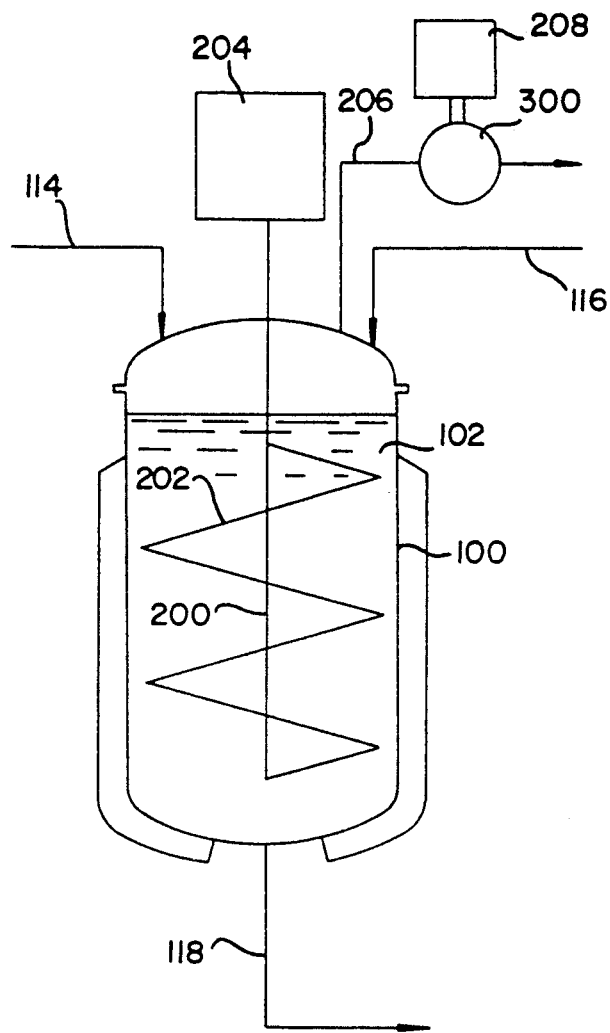
FIG. 2 is a diagrammatic view of a degassing system embodying this invention.

The polymer which has been produced as hereinabove described may be degassed, if required. Attention is, therefore, directed to FIG. 2 showing a degassing device by way of example. It comprises a vessel 100 which is so tightly closed as not to permit any leakage therefrom of the polymer 102, which is a viscous fluid, or any infiltration of air. A plurality of supply pipes 114 and 116 are connected to the top of the vessel 100 for supplying the polymer thereinto and a discharge pipe 118 is connected to the bottom of the vessel 100 for discharging the polymer 102 therefrom. A stirrer 202 is provided in the vessel 100.

The stirrer 202 comprises a spiral ribbon and is rotatably supported on a shaft 200. A rotary drive unit 204 is connected to the shaft 200 for rotating the stirrer 202. An evacuating pipe 206 is connected to the top of the vessel 100 and a vacuum pump 300 is provided in the pipe 206. The vacuum pump 300 is driven by a motor 208 for drawing air out of the vessel 100 through the pipe 206 and thereby creating a reduced pressure in the vessel 100.

Appropriate amounts of the polymer and any additive that may be employed are supplied into the vessel 100 through the pipes 114 and 116 and they are stirred by the stirrer 202. The rotary drive unit 204 includes a device for changing the rotating speed of the shaft 200. The shaft 200 is rotated at a reduced speed to enable the gradual stirring of the polymer 102 by the stirrer 202, while the vacuum pump 300 is driven to create a reduced pressure in the vessel 100. The reduced pressure allows the bubbles in the polymer 102 to expand and acquire a greater floating force. As the polymer 102 is stirred, the bubbles combine into larger bubbles and float to the surface of the polymer 102, whereby the polymer 102 is quickly degassed. The bubbles adhering to the inner wall surface of the vessel 100 are separated therefrom as the polymer 102 is stirred, and are, therefore, easily removed, too. Although the high viscosity of the polymer may hold the bubbles strongly therein, its stirring facilitates the expansion of the bubbles and their combination into larger bubbles and thereby enables their quick removal.

Although the degassing device has been described as being provided separately from the reactors, it is alternately possible to use the second reactor for the degassing purpose if the apparatus comprises two reactors as shown in FIG. 1, and if a device for creating a reduced pressure is added to the second reactor.

Although the stirrer has been described as comprising a sprial ribbon, it is also possible to use a stirrer of any other appropriate construction, for example, one comprising one or more sets of radially extending blades supported on the shaft at different levels of height if more than one set of blades are provided. It is also possible to employ a stirrer of the type which stirs the viscous fluid by vibrating it. It is possible to use any type of stirrer if it can stir the viscous fluid substantially uniformly without causing any entrainment of air into the fluid. The rotating speed of the stirrer depends on its shape and diameter, or in other words, its peripheral velocity, as well as the viscosity of the fluid to be stirred. It is also important to select a rotating speed which does not cause any entrainment of air into the fluid.

There is no limitation to the construction of the tightly closed vessel. The process and apparatus of this invention are not only suitable for the preparation of a viscous fluid resin, but are also useful for the preparation of e.g. a fluid processed food. They are particularly suitable for preparing a fluid having a high viscosity.

Although the invention has been described by reference to the preparation of polyamide acid as a polyimide precursor which is required to be of high quality, not containing impurities, it is also applicable to the preparation of other polymers, such as nylons and polysulfones. It is to be understood that modifications or variations may be easily made by anybody of ordinary skill in the art without departing from the scope and spirit of this invention.

The process of this invention comprises the first step of reacting a solution of one of the two starting materials in an organic solvent with a powder of the other material and the second step of reacting the product of the first step with a solution of the other material in an organic solvent, as hereinabove described. The use of the solution of the other material during the second step ensures the reliable production of a polymer having a substantially uniform final viscosity and a high concentration, as the accurate control of the amount of the material to be added enables the precise control of the viscosity of the polymer. If the product of the first step is filtered, it is possible to ensure the production of a polymer not containing impurities.

The provision of the separate reactors for carrying out the two steps of the process ensures the optimum stirring of the materials during each step of the process that is required by the viscosity and other properties thereof, and thereby the quick production of a uniform polymer, as well as enabling an elevation in operating efficiency of each reactor. While the operation of the first reactor does not require a long time as it is intended for producing a polymer having a low degree of polymerization, the operation of the second reactor requires a long time for the precise control which is required for achieving a high degree of polymerization and a high viscosity. According to this invention, therefore, it is advantageous to provide a plurality of second reactors after one first reactor in order to raise the operating efficiency of the whole apparatus. Moreover, the gradual stirring of the viscous fluid at a reduced pressure in the tightly closed vessel enables a drastic reduction of the time which is required for the removal of bubbles from the fluid, and thereby a great improvement in productivity.

The stirring of the fluid eliminates the necessity for the creation of a high vacuum and enables the uniform distribution of density and viscosity throughout the fluid, as well as its degassing.

The invention will now be described in further detail with reference to several examples which are not intended for limiting the scope of this invention.

COMPARATIVE EXAMPLE 1

A reaction vessel A having a capacity of 500 liters and provided with a stirrer having three stages of Mig blades was charged with 360 liters of dimethylacetamide (DMAc). Then, the sequence of operation as described in the following paragraph was followed, while the temperature of a jacket for the vessel was controlled to hold the internal temperature of the vessel at 10° C.

First, 29.58 kg of 4,4′-diaminodiphenyl ether (DDA) was charged into the reaction vessel A and dissolved in DMAc. Then, 32.22 kg of a powder of pyromellitic acid dianhydride (PMDA) was added into the reaction vessel A little by little over a period of about an hour, whereby a solution of polyamide acid was obtained. The stirrer was rotated at a speed of 180 rpm during the initial period of reaction and at a speed of 50 rpm during the later part thereof, i.e. after the solution had increased its viscosity. After PMDA had been added, the contents of the reaction vessel were stirred for 2 hours to form a uniform mixture.

The foregoing sequence of operation was repeated to prepare 3 batches of polyamide acid solution. Each batch of solution was examined for viscosity in each of the upper, middle and lower portions of the reaction vessel A, whereby its viscosity distribution was determined.

A polyimide film having a thickness of about 25 μm was formed from each batch of solution by a customary method and its elongation at rupture and tensile strength were measured. The results are shown in TABLE 1.

A great difference in viscosity was found from one batch to another and also from one portion of the reaction vessel A to another. All of the polyimide films which had been formed from the solution were low in both elongation at rupture and tensile strength.

TABLE 1

| Batch No. | Viscosity distribution in the reaction vessel (poise at 23° C.) | | | | Physical properties of film (25 μm thick) | |
|---|---|---|---|---|---|---|
| | Upper portion | Middle portion | Lower portion | Average | Elongation at rupture (%) | Tensile strength (kg/mm$^2$) |
| 1 | 510 | 480 | 480 | 490 | 21.0 | 13.6 |
| 2 | 6200 | 4700 | 2300 | 4400 | 32.5 | 15.4 |
| 3 | 3600 | 2500 | 1400 | 4000 | 29.5 | 14.3 |

EXAMPLE 1

The reaction vessel A having a capacity of 500 liters and provided with a stirrer having three stages of Mig blades was charged with 320 liters of DMAc. Then, the steps of operation as described in the following paragraph were taken, while the internal temperature of the vessel was held at 10° C.

First, 29.58 kg DDA was charged into the reaction vessel A and dissolved in DMAc. Then, 27.00 kg of PMDA powder was added into the reaction vessel A little by little over a period of about 50 minutes, whereby a solution of amide acid was obtained. The solution had a viscosity of about 10 poise at 23° C. It was passed through a filter having a mesh size of 0.5 μm, whereby all of the foreign matter having a particle size of 0.5 μm or above was removed from the solution, and all of the solution was, then, returned into the reaction vessel A.

Next, a PMDA solution was prepared by dissolving 4.00 kg of PMDA in 68 liters of DMAc and was purified by a filter having a mesh size of 0.5 μm. The PMDA solution was added into the reaction vessel A at a rate of 10 liters per hour. Its addition was discontinued when the stirrer had increased its current to 50 A. The stirrer was rotated at a speed of 180 rpm when the PMDA powder was added, and at a speed of 50 rpm when its solution was added. After the PMDA solution had been added, the operation of the stirrer was continued for 2 hours to form a uniform mixture in the reaction vessel A.

The foregoing sequence of steps was repeated to prepare 3 batches of polyamide acid solution. Each batch of solution was examined for viscosity in each of the upper, middle and lower portions of the reaction vessel A, whereby its viscosity distribution along the vessel was determined.

A polyimide film having a thickness of about 25 μm was formed from each batch of solution by a customary method and its elongation at rupture and tensile strength were measured. The results are shown in TABLE 2.

Each batch of solution still showed a great difference in viscosity from one portion of the reaction vessel A to another, though there was no longer any great difference in viscosity from one batch to another. The polyimide films, however, showed a great improvement in both of elongation at rupture and tensile strength over those which had been obtained in COMPARATIVE EXAMPLE 1.

TABLE 2

| Batch No. | Distribution of viscosity in the reaction vessel (poise at 23° C.) | | | | Physical properties of film (25 μm thick) | |
|---|---|---|---|---|---|---|
| | Upper portion | Middle portion | Lower portion | Average | Elongation at rupture (%) | Tensile strength (kg/mm$^2$) |
| 1 | 4100 | 2800 | 1900 | 2900 | 89.5 | 20.4 |
| 2 | 3200 | 2700 | 2200 | 2700 | 97.0 | 21.2 |
| 3 | 3700 | 3000 | 2400 | 3000 | 92.5 | 20.8 |

EXAMPLE 2

The reaction vessel A having a capacity of 500 liters and provided with a stirrer having three stages of Mig blades was charged with 320 liters of DMAc. Then, the steps of operation as described in the following paragraph were taken, while the internal temperature of the vessel was held at 10° C. The stirrer was rotated at a speed of 180 rpm.

First, 29.58 kg DDA was charged into the reaction vessel A and dissolved in DMAc. Then, 27.00 kg of PMDA powder was added into the reaction vessel A little by little over a period of about 50 minutes, whereby a solution of amide acid was obtained. The solution had a viscosity of about 10 poise at 23° C. It was purified by a filter having a mesh size of 0.5 μm and all of the purified solution was poured into a reaction vessel B having a capacity of 500 liters and provided with a stirrer having a spiral ribbon blade.

Next, a PMDA solution was prepared by dissolving 4.00 kg of PMDA in 63 liters of DMAc and was purified by a filter having a mesh size of 0.5 μm. The polyamide acid solution in the reaction vessel B was stirred by the stirrer rotated at a speed of 30 rpm and the PMDA solution was added thereinto at a rate of 10 liters per hour. Its addition was discontinued when the stirrer had increased its current to 50 A. After the PMDA solution had been added, the operation of the stirrer was continued for 2 hours to form a uniform mixture in the reaction vessel B.

The foregoing sequence of steps was repeated to prepare 3 batches of polyamide acid solution. Each batch of solution was examined for viscosity in each of the upper, middle and lower portions of the reaction vessel B, whereby its viscosity distribution was determined.

A polyimide film having a thickness of about 25 μm was formed from each batch of solution by a customary method and its elongation at rupture and tensile strength were measured. The results are shown in TABLE 3.

No substantial difference in viscosity was found either from one batch to another or from one portion of the reaction vessel to another. All of the polyimide films showed a great improvement in both of elongation at rupture and tensile strength.

TABLE 3

| Batch No. | Distribution of viscosity in the reaction vessel (poise at 23° C.) | | | | Physical properties of film (25 μm thick) | |
|---|---|---|---|---|---|---|
| | Upper portion | Middle portion | Lower portion | Average | Elongation at rupture (%) | Tensile strength (kg/mm$^2$) |
| 1 | 3100 | 3000 | 3100 | 3100 | 100.0 | 21.8 |
| 2 | 2800 | 2800 | 2800 | 2800 | 98.5 | 21.2 |
| 3 | 2900 | 3000 | 3000 | 3000 | 99.5 | 21.2 |

EXAMPLE 3

The process of EXAMPLE 2 was repeated, except that dimethylformamide (DMF) was substituted for DMAc. The results are shown in TABLE 4.

TABLE 4

| Batch No. | Distribution of viscosity in the reaction vessel (poise at 23° C.) | | | | Physical properties of film (25 μm thick) | |
|---|---|---|---|---|---|---|
| | Upper portion | Middle portion | Lower portion | Average | Elongation at rupture (%) | Tensile strength (kg/mm$^2$) |
| 1 | 2400 | 2500 | 2500 | 2500 | 107.5 | 22.0 |
| 2 | 2800 | 2800 | 2800 | 2800 | 102.0 | 21.4 |
| 3 | 3000 | 2900 | 2800 | 2900 | 97.0 | 21.7 |

EXAMPLE 4

The device as shown in FIG. 2 was charged with the DMAc solution of polyamide acid which had been obtained in EXAMPLE 1, and which was turbid with bubbles. The solution was stirred by a spiral ribbon stirrer having an outside diameter of 735 mm and rotated at a speed of 15 rpm, while the internal pressure of the vessel was reduced to −755 mm/Hg, whereby it was degassed to yield a transparent DMAc solution of polyamide acid.

The rotation of the stirrer at a speed of 30 rpm or above resulted in the entrainment of air into the solution and thereby the formation of new bubbles. The rotation of the stirrer at a speed of 10 rpm or below required a period of about 1 to 2 hours for the production of a transparent solution.

COMPARATIVE EXAMPLE 2

The DMAc solution of polyamide acid which had been obtained in EXAMPLE 1 was left at a standstill, while the internal pressure of the vessel was reduced to −755 mm/Hg. A period of 5 hours was required for producing a transparent solution.

What is claimed is:

1. In a process for manufacturing a polymer by reacting two starting materials in the presence of an organic solvent, the improvement which comprises:

the first step of reacting a solution of a diamine in an organic solvent with a tetracarboxylic dianhydride in the form of a powder to produce a reaction product having a viscosity of not greater than 500 poise; and the second step of reacting a solution of the reaction product of said first step in an organic solvent with a solution of additional said dianhydride in an organic solvent.

2. A process as set forth in claim 1, wherein said diamine is selected from the organic diamine compounds of the general formula I:

$$H_2N-R_0-NH_2 \qquad (I)$$

where $R_0$ is a divalent organic group; and the mixtures thereof, while said dianhydride is selected from the organic tetracarboxylic acid dianhydrides of the general formula II:

(II)

where R is a tetravalent organic group; and the mixtures thereof, said second step yielding an organic solvent solution of polyimide or polyamide acid as a reaction product.

3. A process as set forth in claim 2, wherein said diamine compounds have the general formula III:

$$H_2N-R_1-NH_2 \qquad (III)$$

where $R_1$ is an aliphatic group, a phenylene group, a naphthalene group, a biphenylene group, a group, or a divalent organic group of the general formula IV:

(IV)

where $R_2$ is an alkylene group having 1 to 4 carbon atoms, $$-O-, -S-, -\underset{\underset{O}{\|}}{\overset{\overset{O}{\|}}{S}}-, -\overset{\overset{O}{\|}}{C}-, -\overset{\overset{O}{\|}}{C}O-, -\overset{\overset{O}{\|}}{C}NH-,$$

$$-\underset{\underset{}{}}{\overset{\overset{R_3}{|}}{N}}-, -\underset{\underset{R_5}{|}}{\overset{\overset{R_4}{|}}{Si}}-, -O-\underset{\underset{R_7}{|}}{\overset{\overset{R_6}{|}}{Si}}-O-, -\underset{\underset{O}{\|}}{\overset{\overset{R_8}{|}}{P}}-, \text{ or } -O-\underset{\underset{O}{\|}}{\overset{\overset{R_9}{|}}{P}}-O-$$

where $R_3$ to $R_9$ are each an aliphatic or an aromatic group; or the mixtures thereof, while said dianhydrides are the compounds of the general formula V:

(V)

where $R_{10}$ is an aliphatic group, (where $R_{11}$ and $R_{12}$ are each a hydrogen atom or a methyl group), or or a mixtures, said second step yielding an organic solvent solution of polyimide or polyamide acid as a reaction product.

4. A process as set forth in claim 2 or 3, wherein said organic solvent is selected from N,N-dimethylformamide, N,N-dimethylacetamide, dimethyl sulfoxide and N-methyl-2-pyrrolidone, and the mixtures thereof.

5. A process as set forth in claim 3, wherein said diamine is 4,4'-diaminodiphenyl ether as selected from said organic diamines of the general formula III.

6. A process as set forth in claim 3, wherein said dianhydride is pyromellitic acid dianhydride as selected from said organic tetracarboxylic acid dianhydrides of the general formula V.

7. A process as set forth in claim 1, further including the step of filtering said reaction product of said first step prior to said second step.

8. A process as set forth in claim 1 or 7, wherein said second step further includes adding a filler.

9. A process as set forth in claim 1 or 7, further including the step of degassing said reaction product of said second step, said degassing step comprising stirring said reaction product slowly and exposing it to a reduced pressure to cause the growth of bubbles which it contains.

10. The process as claimed in claim 1 wherein substantially all of the diamine to be used in said reaction is in said solution and is reacted with only a portion of the tetracarboxylic dianhydride reactant in said first step.

11. The process as claimed in claim 10 wherein up to about 99 percent of said dianhydride is reacted with said diamine in said first step.

12. The process as claimed in claim 10 wherein about 97 to 95 percent of said dianhydride is reacted with said diamine in said first step.

* * * * *